Sept. 15, 1931.                W. D. DUNN                1,823,648
                             UMBRELLA HOLDER
                          Filed Sept. 26, 1930

Inventor
Walter D. Dunn
By Roberts, Cushman & Woodbury
Attys

Patented Sept. 15, 1931

1,823,648

UNITED STATES PATENT OFFICE

WALTER D. DUNN, OF BELMONT, MASSACHUSETTS

UMBRELLA HOLDER

Application filed September 26, 1930. Serial No. 484,611.

This invention relates to holders for umbrellas, parasols or the like, and pertains more particularly to a receptacle adapted to be mounted within an automobile or other vehicle to receive a wet umbrella. The principal object of the invention is to provide an inexpensive, waterproof umbrella holder which may be readily attached to the body of an automobile or other suitable support adjacent an entrance to the vehicle so that an entering passenger may deposit an umbrella therein, thereby providing a convenient receptacle for the article and protecting the furnishing of the automobile and the clothing of the occupants from contact with a water-soaked umbrella.

Further objects reside in the structural features of the holder hereinafter described, which is especially adapted for use in an automobile and which is shown in the accompanying drawings as illustrative of one practical embodiment of my invention. It will be understood, however, that my improved holder may be employed in other associations and that its structure may be modified to suit particular purposes without departing from the spirit of this invention as defined in the appended claims.

In the particular embodiment chosen for the purpose of illustration, the holder is made of flexible sheet material such as textile fabric having a waterproofed interior and is provided at one side with a longitudinal reinforcing stiffening member which may be a metal rod or bar; and the holder is affixed in upright position against an interior wall of the automobile, for example the back 6 of the front seat of a sedan-type car, by detachable fastenings. The case indicated generally by the numeral 7 is made in the form of an elongate case or bag, tapering inwardly from its open top to its closed bottom end, and may comprise a covering 8 of plush or other fabric and a lining 9 of rubber or waterproofed sheeting.

Figure 1:
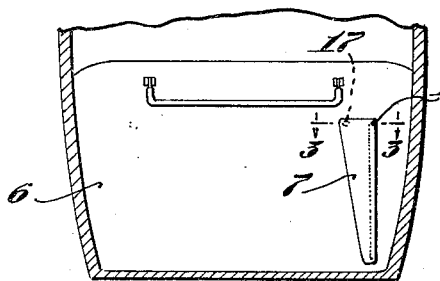
Fig. 1 illustrates the improved holder mounted at the back of the front seat of an automobile.
Figure 3:
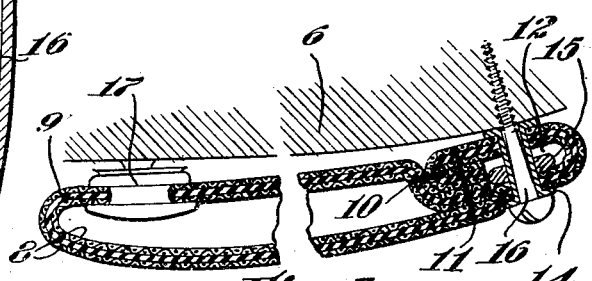
Fig. 3 is an enlarged section through the holder, taken on line 3—3 of Fig. 1.
Figure 4:
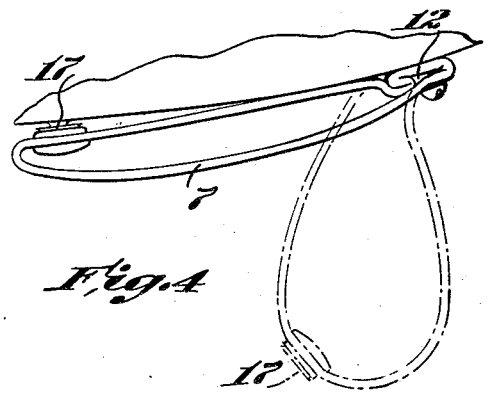
Fig. 4 is a plan view of the holder, showing alternative positions thereof.
Figure 2:
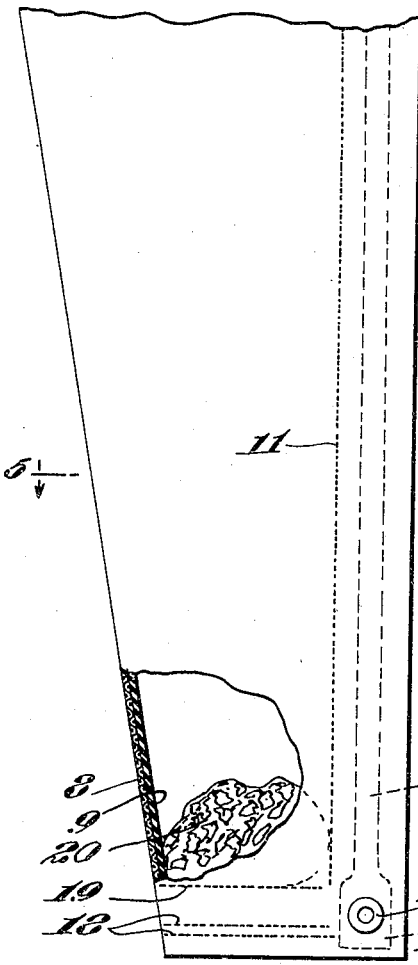
Fig. 2 is an enlarged elevation of the lower portion of the holder, a portion of the material being broken away.
Figure 5:
Fig. 5 is a section on line 5—5 of Fig. 2.

The longitudinal margins of the superposed sheets are preferably turned inwardly and sewed together as by stitching 10 and 11 to provide a hem 12 extending longitudinally of the receptacle and enclosing the stiffening rod 13. The rod may be secured in position by tubular rivets 14 extending through apertures in its flattened ends 15 and fastened upon the fabric, and the holder 7 may be conveniently attached to the back 6 by screws 16 or other fastenings passed through one or both of the hollow rivets 14. Hence, by means of the fastenings 16 and the stiffener 13, the hemmed or reinforced side of the case 7 is rigidly attached to the back 6 or other supporting wall, and an umbrella may easily be inserted at the mouth of the holder when the flexible receptacle is in the position indicated by the broken lines of Fig. 4.

When the holder is empty the wide-mouthed portion of the case is preferably fastened back against the support 6 by means of a common type of two part snap-fastener indicated at 17, one element of the fastener being fixed to the support and the other secured to the fabric body remote from the hem 12. By this arrangement the mouth of the receptacle is substantially closed and the empty holder occupies a minimum of space within the vehicle; yet the fastener 17 may be quickly released to permit the insertion of an umbrella within the opened mouth of the case.

The bottom end of the receptacle is closed as by stitching 18, 19; and a sponge 20 or other absorbent element is preferably placed therein, to collect drippings from the wet umbrella. The waterproof lining 9 protects the exterior fabric 8 of the case from moisture or soilage, and the sponge will ordinarily absorb excess water or moisture and may be removed, wrung out and replaced when necessary without detaching the holder. However, the holder may readily be removed from its support by unscrewing the fastenings 14 whenever it is desired to clean the lining or covering.

From the foregoing, it is apparent that I have provided a simple and economical holder for umbrellas, parasols or similar articles which are usually held by the occupants of a vehicle or deposited against a seat or upon the floor where they are likely to interfere with the passengers, are subject to damage or soiling, or are apt to be forgotten when the occupant leaves the vehicle. Although the waterproofed holder herein described has especial utility in safeguarding occupants from contact with a wet umbrella or other article which may be damp or dirty, it is obviously adapted to receive walking sticks, parasols or the like which are relatively clean and dry. The flexible case or body portion of the holder will readily conform to the shape of the article therein deposited, while the stiffening rod or reinforcement disposed along one side of the case prevents longitudinal collapse of the limp fabric and assists in securing the holder close to its supporting wall. When the support is vertical, a single screw, nail or hook passing through the rivet 14 at the upper end of the holder will usually be adequate for attaching or suspending the holder in proper position, but for greater security a supplemental fastening at the bottom of the case is recommended.

I claim:

1. A holder for umbrellas or the like, adapted for attachment to a supporting wall and comprising a receptacle of flexible material having a hem extending longitudinally thereof, a rigid member in said hem, and a hollow fastener adjacent the mouth of the receptacle securing the rigid member to said hem, said fastener being adapted to receive an attachment for mounting the holder upon the supporting wall, and a fastening element affixed to the case adjacent its mouth and remote from said fastener for securing the upper end of the empty case against said wall.

2. In combination with a supporting wall, a holder of the class described comprising a receptacle formed of flexible material and having a wide, open mouth and a relatively narrow, closed end, and provided with a longitudinal reinforcement, and means passing through the reinforced portion of the receptacle and into the wall for mounting the holder thereon.

3. In combination with a supporting wall, a holder of the class described comprising a receptacle formed of flexible material and having a wide, open mouth and a relatively narrow, closed end, and provided with a longitudinal reinforcement, and means passing through the reinforced portion of the receptacle and into the wall for mounting the holder thereon, and complemental fastenings on the wall and at the mouth of the receptacle for detachably holding the empty receptacle against the wall.

4. A holder for umbrellas or the like, adapted for attachment to a supporting wall and comprising an elongate receptacle of flexible material having a longitudinal hem extending substantially from top to bottom thereof, a reinforcing rod in said hem, the rod having flat ends, and hollow fasteners secured through the hem and the flattened portions of the rod and adapted to receive an attachment for mounting the holder upon the supporting wall.

5. A receptacle of the class described having side and bottom walls of normally flexible material, the receptacle being open at its top and tapering in width toward its bottom, an elongate stiffening member extending downwardly from the top of the receptacle, means adjacent to said stiffening means for permanently attaching the receptacle to a support, and means spaced from said stiffening means for detachably securing the receptacle to the support.

6. A holder for umbrellas or the like adapted for attachment to a support and comprising a piece of flexible fabric folded longitudinally to form two plies and to bring its opposite edges into juxtaposition, means permanently uniting said edges to form a longitudinal closure, means uniting the plies so as permanently to close the bottom of the receptacle, the receptacle being open at its top and tapering downwardly in width, means providing a waterproof liner for the receptacle, and means for attaching the receptacle to the support.

7. A holder for umbrellas or the like adapted for attachment to the back of a vehicle seat, said receptacle comprising a sheet of moisture resistant fabric and a piece of textile fabric superposed thereon, said pieces of fabric being folded longitudinally to form front and rear walls of the receptacle, means permanently uniting said walls at their free longitudinal and bottom edges, the receptacle being open at its top and tapering downwardly in width, stiffening means extending substantially from top to bottom of the receptacle along an edge thereof, and means adjacent to said stiffening means for attaching the receptacle to said seat back.

Signed by me at Boston, Massachusetts this 24th day of September, 1930.

WALTER D. DUNN.